Figure 1:
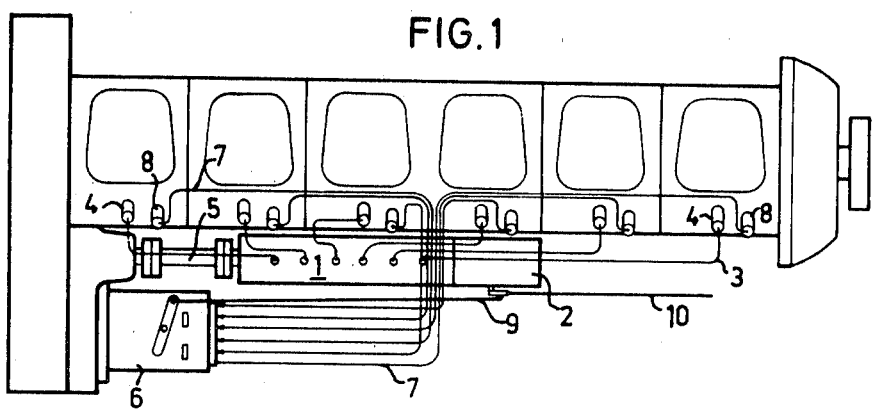

United States Patent [19]

Holmer

[11] 4,399,786
[45] Aug. 23, 1983

[54] METHOD FOR PILOT INJECTION OF FUEL IN DIESEL ENGINES

[75] Inventor: Heinz E. A. Holmer, Gothenburg, Sweden

[73] Assignee: AB Volvo, Gothenburg, Sweden

[21] Appl. No.: 181,241

[22] Filed: Aug. 25, 1980

Related U.S. Application Data

[62] Division of Ser. No. 962,031, Nov. 15, 1978, Pat. No. 4,273,084.

[30] Foreign Application Priority Data

Nov. 23, 1977 [SE] Sweden .............................. 7713231

[51] Int. Cl.³ .............................................. F02B 3/06
[52] U.S. Cl. ..................................... 123/301; 123/576; 123/276; 123/179 L; 123/299
[58] Field of Search ............... 123/261, 276, 295, 299, 123/301, 576, 577, 578, 179 L, 308

[56] References Cited

U.S. PATENT DOCUMENTS

| | | | |
|---|---|---|---|
| 1,543,638 | 6/1925 | Burger | 123/578 |
| 2,269,104 | 1/1942 | Hedlund | 123/276 |
| 2,484,009 | 11/1949 | Barber | 123/301 |
| 2,606,538 | 8/1952 | Malin | 123/301 |
| 3,022,425 | 2/1962 | Rockstead | 123/577 |
| 4,080,937 | 3/1978 | Wolters | 123/276 |
| 4,273,084 | 6/1981 | Holmer | 123/276 |

FOREIGN PATENT DOCUMENTS

| | | |
|---|---|---|
| 851570 | 7/1949 | Fed. Rep. of Germany . |
| 2330177 | 1/1974 | Fed. Rep. of Germany . |
| 326045 | 4/1935 | Italy . |
| 340664 | 1/1931 | United Kingdom . |
| 1457009 | 4/1973 | United Kingdom . |

OTHER PUBLICATIONS

"What Can Be Gained by Pilot Injection" by P. H. Schweitzer, Automotive Industries, vol. 79, No. 18, Oct. 29, 1938.

Primary Examiner—Parshotam S. Lall
Attorney, Agent, or Firm—Young & Thompson

[57] ABSTRACT

A method for the pilot injection of fuel in a direct injection diesel engine with a depression in the tops of the pistons. The pilot fuel, of relatively high cetane number, e.g. diesel fuel, is sprayed prior to the main spray, obliquely from the side into the piston depression in a direction counter to the rotation of the intake air. Thereafter, during the same combustion cycle, the main spray, of lower cetane number, e.g. methanol, is sprayed in a zone around the center axis of the piston depression. A substantial reduction in pollutants is achieved.

11 Claims, 4 Drawing Figures

METHOD FOR PILOT INJECTION OF FUEL IN DIESEL ENGINES

This application is a division of my copending application Ser. No. 962,031, filed Nov. 15, 1978, now U.S. Pat. No. 4,273,084.

The present invention relates to a method for the pilot injection of fuel in direct injection diesel engines with a depression in the tops of the pistons, said invention comprising a first injection pump with a regulator and accompanying first injector for each cylinder, said injectors being disposed to spray the fuel in a zone around the center axis of the respective piston depression.

Modern diesel engines with injection systems of the above type give off large amounts of harmful substances, due to the fact that these conventional injection systems cannot be optimized both for low and high load. The systems are designed for high load, resulting in a high level of hydrocarbon emissions at low load.

One purpose of the present invention is to achieve a method of pilot fuel injection which makes possible a reduction of the engine's harmful emissions. A further purpose of the invention is to achieve an injection method which will make possible the combustion of an engine fuel with a low cetane number, methanol for example, to contribute to said reduction of the harmful emissions.

This is achieved according to the invention, in an injection method of the type described in the introduction, by providing the system with a second injection pump with a regulator and accompanying second injectors for each cylinder, said second injectors being disposed to inject fuel obliquely from the side into the respective piston depression in a direction counter to the rotation of the intake air before the fuel from the first injectors is injected.

In an injection method of this type, the first pump and injectors can be optimized for high load and the second pump and injectors for low load. By injecting diesel fuel through the latter obliquely counter to the air rotation in the piston depression, a rapid retarding of the fuel is achieved which is thereby carried by the air in the combustion chamber with minimal mixing in an annular zone around the center of the piston depression. The high concentration of fuel drops in this zone creates especially favorable conditions for compression ignition due to the fact that the fuel-air mixture does not become too lean during the ignition delay period. Only a small portion on the edges of the zone has time to be mixed with air to such an extent that the air-fuel mixture lies outside the limits for ignition. This is illustrated by the fact that if only the second injectors inject fuel at idle, the hydrocarbon emission is reduced by 90% down to 50 ppm HC compared with the same engine with an ordinary injection system.

Another result of the high concentration of fuel in this zone is that the combustion is quickly retarded by lack of oxygen. This reduction of the speed of combustion results in a very low noise level and reduction of the high noise frequencies which otherwise characterize diesel combustion. Combustion with reduced oxygen supply produces soot, so only a limited amount of fuel can be injected via the second nozzle in order to avoid excessively high levels of exhaust smoke.

This zone of hot gases and glowing soot particles which is created upon combustion of the fuel from the second injectors initiates the combustion of the fuel from the first injectors when these begin operating at high load. For this reason, the last-mentioned fuel can be a fuel with a low cetane number, methanol for example. The subsequent combustion of the fuel from the first injectors, which are designed for maximum dispersion of the fuel in the combustion of air, produces low nitrogen oxide emission since there is no spontaneous combustion of large quantities of air-fuel mixture, collected during an ignition delay period with locally high temperatures as a result.

Tests with diesel-methanol fuel have revealed very low emissions of nitrogen oxides and black smoke. With diesel-diesel fuel, the emission of black smoke can be reduced if no fuel is injected through the second injectors at high load.

Figure 4:
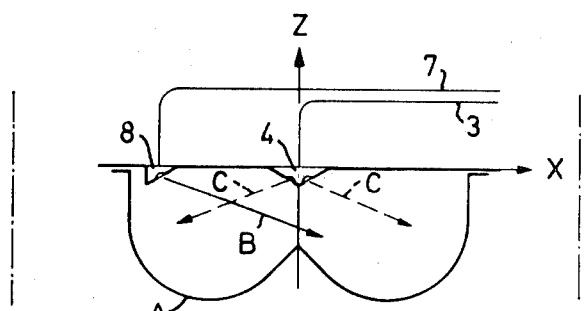
Figure 2:
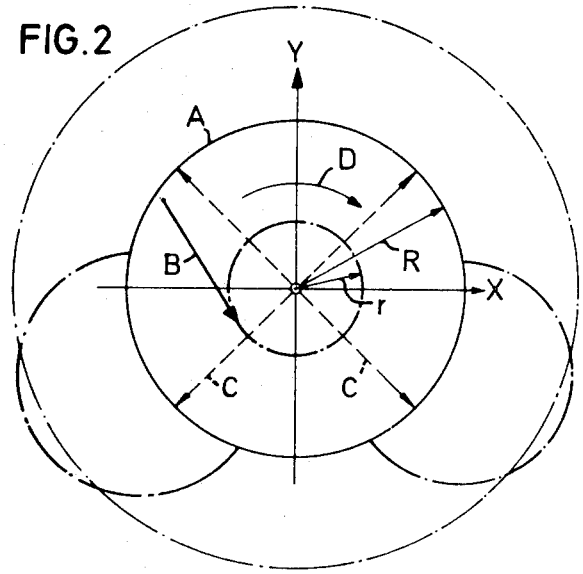
Figure 3:
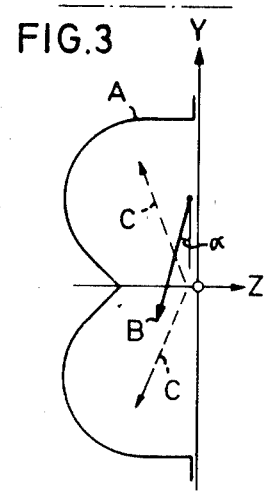

The invention will be described below with reference to the accompanying drawings showing examples, in which FIG. 1 shows a schematic view from above of a diesel engine provided with a fuel injection system adapted to perform a method according to the invention, and FIGS. 2–4 are full scale projections from above and from two sides of a piston depression illustrating the injection directions for the fuel.

The engine shown in FIG. 1 has a first injection pump 1 with a regulator 2. The pump is a conventional row pump, which via delivery pipes 3 feeds fuel to first injectors 4 with four-hole nozzles. The pump 1 is driven in a conventional manner by the engine crankshaft via a gear transmission and a shaft 5.

The engine is also provided with a second injection pump 6 with a regulator. In the example shown, the pump 6 is a distributor pump, which via delivery pipes 7 feeds fuel to second injectors 8, which are provided with one-hole nozzles. Pump 6 is also driven by the engine crankshaft via a gear transmission. A linkage 9 connects the regulator of pump 6 to the regulator 2 of pump 1 and to a gas pedal 10. The pump 6 has two volume settings. The greater injection volume is used only when starting and warming up, the lower when driving. The pump 6 also has an r.p.m-dependent adjuster to adjust the fuel injection timing.

The injection angle of the first pump 1 is set about ten degrees of rotation of the crank shaft later than the second pump 6, so that the fuel from pump 1 does not disturb the ignition delay and the ignition of the fuel from pump 6. The two pump regulators are connected via linkage 9 in such a way that at low load (idle) only pump 6 injects fuel and as the load increases pump 6 first increases to its full load volume (the set injection volume for driving), and then pump 1 increases to the injection volume which is required for the desired load. When load is reduced, pump 1 decreases first.

The injection system described here consists of two individual injection systems, the second of which is used to inject a small amount of fuel with high cetane number, diesel fuel for example, to reduce the hydrocarbon emission at low compression and initiate combustion, while the first system is used to inject the fuel volume which is required for the load in question. The latter fuel can be diesel fuel or a fuel with low cetane number such as an alcohol, methanol for example.

To achieve a suitable fuel-air mixture to achieve the above-mentioned advantageous characteristics, the fuel from the second system must be oriented in an annular zone around the center. For this purpose, the second injectors 8 are disposed in such a way that the fuel is injected counter to the rotation of the intake air in the depression of the piston. This is illustrated in FIGS. 2-4, in which A is a depression in the top of a piston shown in full scale, B designates the injection direction of the second injectors 8, C designates the injection direction of the first injectors 4, and D designates the direction of rotation of the intake air. In FIG. 2 the left-hand dot-dash circle indicates the placement of the intake valve and the right-hand circle indicates the placement of the exhaust valve. The upper wall of the combustion chamber lies in the plane of the x-y axes.

FIGS. 2-4 illustrate the conditions in an engine used for testing. The first injectors 4 had four-hole nozzles, which injected the fuel in a uniform distribution around the vertical center axis z of the depression A, as indicated by the arrows C. The second injectors 8 injected the fuel through one-hole nozzles in a direction which is indicated by the arrow B. Optimal results, with reduction of hydrocarbon emissions by 90% of idle for example, were obtained when the projection of arrow B (the direction of the injection) onto the cross-sectional plane of the piston, as shown in FIG. 2, is tangent to a circle whose radius r is about 4/10 of the radius of the piston depression, and when the angle $\alpha$ with said plane was about 15°. When fuel was injected closer to the center of the depression (reduction of r) the amount of soot increased, while hydrocarbon emission increased with injection farther from the center (increase of r). Depending on engine type, r can be 0.35-0.45 times R and $\alpha$ be about 10°-20°.

What is claimed is:

1. In a fuel injection method for direct injection diesel engines with a depression in the tops of the pistons, in which a first injection pump with a regulator and accompanying first injector for each cylinder sprays fuel with a relatively low cetane number in a main spray in a zone around the center axis of the respective piston depression; the improvement comprising injecting a pilot spray of a fuel with a relatively high cetane number from a second injection pump (6) with a regulator and accompanying second injectors (8) for each cylinder, from the side into the respective piston depression in a direction (B) toward a central zone in the piston depression in which the intake air rotates, operating both of said injection pumps during a combustion cycle, and injecting said pilot spray before said main spray so that the compression combustion of the fuel from the second injection pump (6) can initiate the combustion of the fuel from the first pump (1).

2. Injection method according to claim 1, in which each respective first injector (4) is disposed to inject the fuel with a large uniform distribution around the center axis (Z) of the piston depression, while each respective second injection (8) is disposed to inject the fuel with a small distribution obliquely from the side into the piston depression (A).

3. Injection method according to claim 1, in which the first injectors (4) have multi-hole nozzles, while the second injectors (8) have single-hole nozzles.

4. Injection method according to claim 1, in which each respective second injector (8) is disposed to inject the fuel from a location on or in the vicinity of the periphery of the piston depression (A) and with an injection path (B), which forms an angle ($\alpha$) of between 10° and 20° with a cross-sectional plane through the cylinder and whose projection onto said plane is tangent to a circle concentric to the periphery of the piston depression, the radius (r) of said circle being between 0.35 and 0.45 times the radius (R) of the piston depression.

5. Injection method according to claim 4, in which said angle ($\alpha$) is about 15°.

6. Injection method according to claim 4, in which said radius (r) is about 0.40 times the radius (R) of the piston depression.

7. Injection method according to claim 1, in which the second injection pump (6) is set to essentially only inject the required amount of fuel for starting, warming up and idling, the first injection pump (1) being inactive when the engine is idling.

8. Injection method according to claim 1, in which the first injection pump (1) is set to inject fuel at about 10 degrees of rotation of the crankshaft after the second injection pump (6).

9. Injection method according to claim 1, in which said fuel of relatively low cetane number is an alcohol.

10. Injection method according to claim 9, in which said alcohol is methanol.

11. Injection method according to claim 1, in which the pilot spray is injected obliquely from the side into the respective piston depression in a direction (B) which is counter to the rotation of the intake air.

* * * * *

UNITED STATES PATENT AND TRADEMARK OFFICE
CERTIFICATE OF CORRECTION

PATENT NO. : 4,399,786

DATED : August 23, 1983

INVENTOR(S) : Heinz E. A. Holmer

It is certified that error appears in the above-identified patent and that said Letters Patent is hereby corrected as shown below:

The term of this patent subsequent to June 16, 1998 has been disclaimed.

Signed and Sealed this

First Day of March, 1988

Attest:

DONALD J. QUIGG

*Attesting Officer*　　　　　*Commissioner of Patents and Trademarks*